W. I. SLICHTER.
MOTOR CONTROL.
APPLICATION FILED JUNE 23, 1909.
973,575.
Patented Oct. 25, 1910.
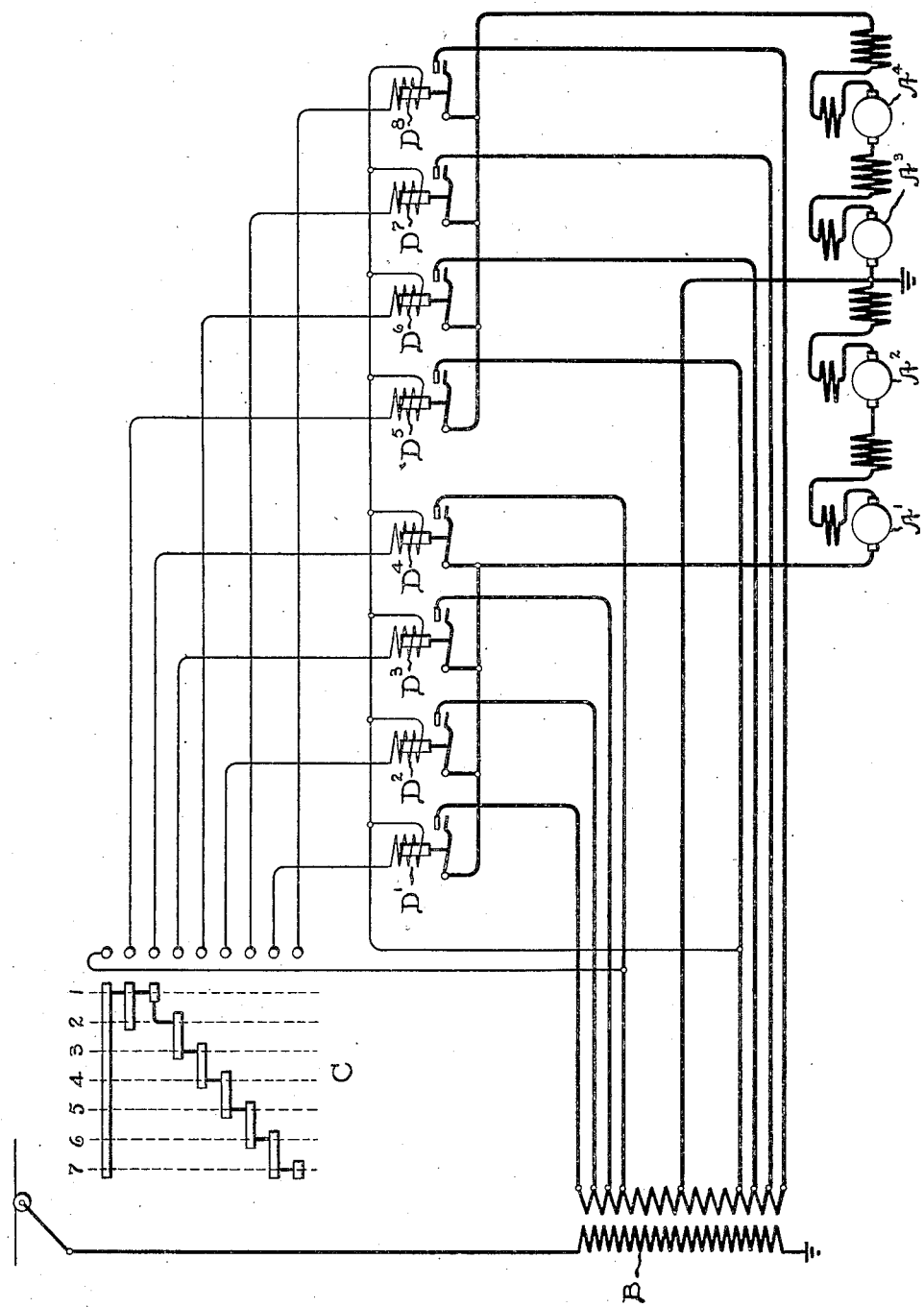
WITNESSES:
INVENTOR
WALTER I. SLICHTER.
BY
ATT'Y.

UNITED STATES PATENT OFFICE.

WALTER I. SLICHTER, OF SCHENECTADY, NEW YORK, ASSIGNOR TO GENERAL ELECTRIC COMPANY, A CORPORATION OF NEW YORK.

MOTOR CONTROL.

973,575.  Specification of Letters Patent.  Patented Oct. 25, 1910.

Application filed June 28, 1909. Serial No. 504,623.

*To all whom it may concern:*

Be it known that I, WALTER I. SLICHTER, a citizen of the United States, residing at Schenectady, county of Schenectady, State of New York, have invented certain new and useful Improvements in Motor Control, of which the following is a specification.

My invention relates to the control of a plurality of electric motors mechanically connected to drive a common load as, for instance, the control of a plurality of motors driving an electric car or locomotive.

The object of my invention is to provide a simple method of control and arrangement of apparatus adapted therefor whereby the motors may be started and accelerated without at any time opening the circuit of all the motors.

In carrying out my invention I connect the motors electrically in a plurality of groups and my method of control consists in starting the motors by impressing reduced voltages on the groups, and increasing the voltages of the groups alternately. While the circuit connections of one group are being varied to increase the impressed voltage on that group, the circuit connections of the other group or groups are maintained, so that all the motors are never open circuited.

My invention is particularly advantageous in its application to alternating current motors, since the transformer winding from which the motors are supplied forms a convenient means for supplying voltages to the several motor groups independently. The motors may, for instance, be connected all in series to points on the transformer winding, and a connection made from the middle point of the motor circuit to an intermediate point on the transformer winding so as to divide the motors into two groups on which independent voltages are impressed from the transformer; then, by shifting the terminal connections alternately with respect to the intermediate point of the transformer winding, the voltages on the two groups of motors are alternately increased, the circuit of each group being maintained while the circuit connections of the other are being varied.

My invention will best be understood by reference to the accompanying drawing which shows diagrammatically a motor control system arranged in accordance with my invention.

In the drawing, $A'$ to $A^4$ represent four alternating current motors, diagrammatically shown as of the compensated series type.

B represents a transformer for supplying current to the motors.

C represents a master-switch and $D'$ to $D^6$ contactors controlled by the master-switch C and controlling the motor circuit. The middle point of the motor circuit, that is, the junction between motors $A^2$ and $A^3$, is connected to the center of the secondary winding of the transformer B, so as to divide the motors into two groups, one consisting of motors $A'$ and $A^2$ and the other of motors $A^3$ and $A^4$. This intermediate connection may be grounded, as indicated in the drawing, in order to keep the insulation strains between the motor windings and the frames down to an amount not exceeding half the secondary voltage of the transformer B.

When the switch C is moved to its first position, indicated by dotted line 1, contactors $D^4$ and $D^5$ are energized and connect the terminals of the motor circuit to the two points on the secondary of the transformer B nearest to the central point. As the switch C is moved from its first to its second position, contactor $D^4$ is deënergized and contactor $D^3$ is then energized, so as to shift one terminal of the motor circuit farther away from the central point on the transformer. While the circuit of motors $A'$ and $A^2$ is momentarily opened during this change in connections, the circuit of motors $A^3$ and $A^4$ is kept closed. In moving from its second to its third position, contactor $D^3$ remains energized but contactor $D^5$ is deënergized and contactor $D^6$ then energized. Thus the other terminal of the motor circuit is shifted farther away from the central point on the transformer. As the switch C is moved through its other positions the terminals of the motor circuit are thus alternately shifted so as to increase the voltage impressed on the two groups of motors step-by-step and alternately and at no time are more than half the motors open circuited. Furthermore, since while the motors are operating, independent voltages are impressed on each group, slipping of the wheels driven by one motor or group of motors cannot rob the motors of the other group of voltage as would be the case if the motors were all in series in a single group.

I do not desire to limit myself to the particular arrangement and connections shown and described, but aim in the appended claims to cover all modifications which are within the scope of my invention.

What I claim as new and desire to secure by Letters Patent of the United States, is,—

1. The method of operating a plurality of electric motors mechanically connected to drive a common load, and connected electrically in a plurality of groups, which consists in starting the motors by impressing reduced voltages on the groups, and increasing the voltages on said groups alternately.

2. The method of operating a plurality of electric motors mechanically connected to drive a common load, and connected electrically in a plurality of groups, which consists in starting the motors by impressing reduced voltages on the groups, and increasing the voltages on said groups alternately step-by-step, the voltage being maintained on one group while the voltage on another group is being increased.

3. The method of operating a plurality of electric motors mechanically connected to drive a common load, and connected electrically in a plurality of groups, which consists in so connecting the groups to the source that voltages are impressed on the groups independently, and varying the connections of said groups alternately to increase the impressed voltages.

4. The method of operating a plurality of electric motors mechanically connected to drive a common load, and connected electrically in a plurality of groups, which consists in so connecting the groups to the source that voltages are impressed on the groups independently, and varying the connections of said groups alternately to increase the impressed voltages step-by-step, the connections of one group being maintained while the connections of another group are being varied.

5. In combination, a plurality of electric motors mechanically connected to drive a common load and electrically connected in a plurality of groups, means for impressing voltages on said groups independently, and a controlling switch adapted to vary the voltage on the several groups alternately.

6. In combination, a plurality of electric motors mechanically connected to drive a common load and electrically connected in a plurality of groups, means for impressing voltages on said groups independently, and a controlling switch adapted to vary the connections of said groups alternately to increase their impressed voltages step-by-step and to maintain the connections of one group while varying those of another.

7. In combination, a plurality of electric motors mechanically connected to drive a common load and electrically connected in a plurality of groups, a source of independent voltages for the several groups, and a controlling switch adapted to connect the several groups to the source and to vary the connections of said groups alternately to increase the impressed voltages step-by-step.

8. In combination, a plurality of electric motors mechanically connected to drive a common load and electrically connected in a plurality of groups, a source of independent voltages for the several groups, and a controlling switch adapted to connect the several groups to the source, in moving to a subsequent position to vary the connections of one group to increase its impressed voltage while maintaining the connections of a second group, and in moving to a still subsequent position to vary the connections of the second group to increase its impressed voltage while maintaining the connections of the first group.

9. In combination, a plurality of alternating current motors mechanically connected to drive a common load and electrically connected in a plurality of groups, a transformer winding for supplying current to said motors, and a switch adapted to connect said groups independently to said winding and to vary alternately the connections of said groups to said winding, maintaining the connections of one group while varying that of another.

10. In combination, a plurality of alternating current motors mechanically connected to drive a common load and electrically connected in series, a transformer winding for supplying current to said motors, connections from the terminals of the motor circuit to points on the transformer, a connection from an intermediate point of the motor circuit to an intermediate point on the transformer, and a controlling switch adapted to shift the terminal connections alternately with respect to said intermediate point on said winding.

In witness whereof, I have hereunto set my hand this 22nd day of June, 1909.

WALTER I. SLICHTER.

Witnesses:
BENJAMIN B. HULL,
HELEN ORFORD.